United States Patent
Krietemeyer et al.

(10) Patent No.: US 12,454,293 B2
(45) Date of Patent: Oct. 28, 2025

(54) SYSTEM AND METHOD FOR AUTOMATIC WHEEL DIAMETER MEASUREMENT AND CALIBRATION

(71) Applicant: Siemens Mobility, Inc., New York, NY (US)

(72) Inventors: James R. Krietemeyer, Brooklyn, NY (US); Ervin Vakufac, Pittsburgh, PA (US)

(73) Assignee: Siemens Mobility, Inc, New York, NY (US)

( * ) Notice: Subject to any disclaimer, the term of this patent is extended or adjusted under 35 U.S.C. 154(b) by 203 days.

(21) Appl. No.: 18/047,058

(22) Filed: Oct. 17, 2022

(65) Prior Publication Data
US 2024/0124036 A1 Apr. 18, 2024

(51) Int. Cl.
*B61K 9/12* (2006.01)
*G01M 17/10* (2006.01)

(52) U.S. Cl.
CPC ............... *B61K 9/12* (2013.01); *G01M 17/10* (2013.01)

(58) Field of Classification Search
CPC ................................. B61K 9/12; G01M 17/10
USPC ........................................................ 701/33.1
See application file for complete search history.

(56) References Cited

U.S. PATENT DOCUMENTS

| | | | | |
|---|---|---|---|---|
| 6,148,269 A * | 11/2000 | Kumar | .................... | B60T 8/173 180/209 |
| 7,283,897 B2 | 10/2007 | Kane et al. | | |
| 8,560,227 B2 * | 10/2013 | Feng | .................... | G01C 21/343 701/426 |
| 10,151,582 B1 * | 12/2018 | Jovenall | .................... | B61K 9/12 |
| 2005/0065664 A1 * | 3/2005 | Tsuruhara | ............... | B60T 8/172 701/1 |
| 2009/0055043 A1 * | 2/2009 | Mian | ...................... | G06Q 10/06 701/31.4 |
| 2010/0191399 A1 * | 7/2010 | Kono | ...................... | B61K 9/12 701/22 |
| 2012/0116617 A1 * | 5/2012 | Schaffler | ................... | B60L 3/10 701/20 |
| 2012/0136637 A1 * | 5/2012 | Duan | ....................... | B61K 9/12 703/2 |
| 2020/0108847 A1 * | 4/2020 | Oswald | ................ | G01B 11/255 |
| 2020/0122755 A1 * | 4/2020 | Claussen | ................. | B60L 3/106 |
| 2021/0291882 A1 * | 9/2021 | Snyder | .................. | G01M 17/10 |
| 2024/0067239 A1 * | 2/2024 | Asuka | .................. | B61L 15/0094 |

FOREIGN PATENT DOCUMENTS

CN 107054404 A * 8/2017 ............... B61K 9/02

* cited by examiner

*Primary Examiner* — Andrew R Dyer

(57) ABSTRACT

A system for automatic wheel diameter measurement and calibration comprises one or more sensing device(s) configured to sense rotation of a wheel and provide rotation data of the wheel, a positioning system configured to provide positioning data of a vehicle, a database including milepost and distance data, and a controller configured to automatically calculate a wheel diameter and a wheel diameter inaccuracy based on the rotation data, the positioning data, and a distance between a start point and an end point extracted from the database, during operation of the vehicle. Further, an associated method and non-transitory computer readable medium are described.

18 Claims, 8 Drawing Sheets

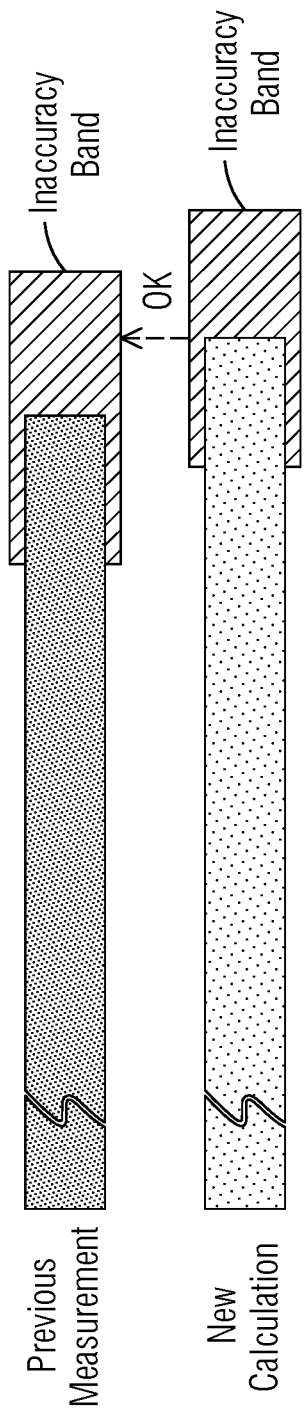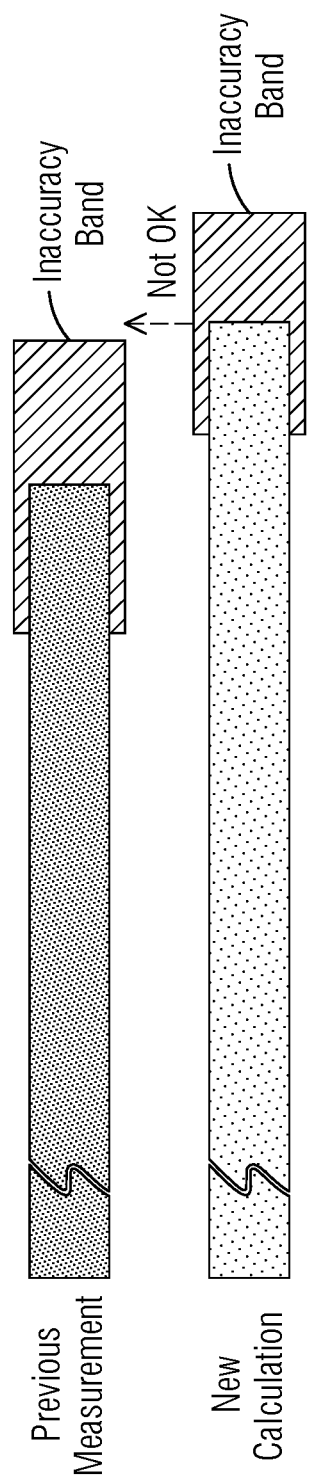
FIG. 5a
FIG. 5b

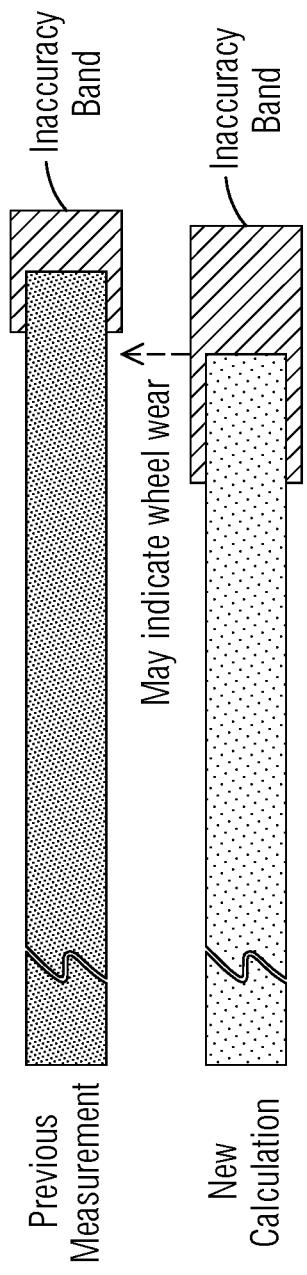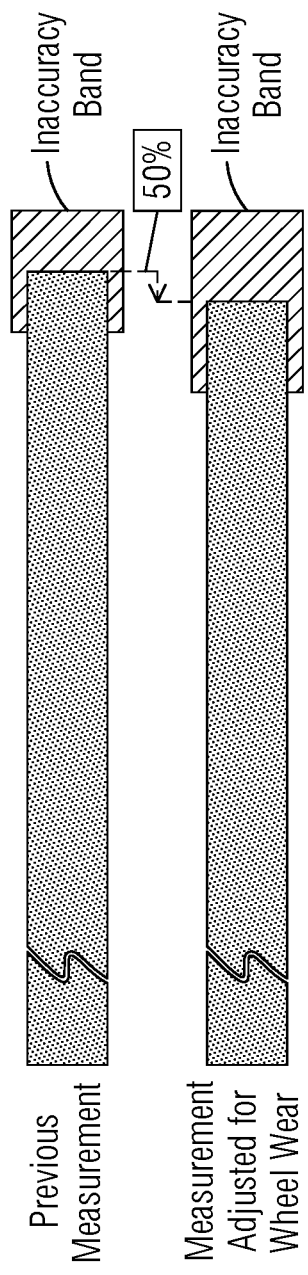

SYSTEM AND METHOD FOR AUTOMATIC WHEEL DIAMETER MEASUREMENT AND CALIBRATION

BACKGROUND

1. Field

Aspects of the present disclosure generally relate to vehicles, and more particularly to systems and methods for an automatic wheel diameter measurement and calibration.

2. Description of the Related Art

Controlling movement of vehicles, e. g. trains, in a modern environment is a complex process. Collisions with other trains must be avoided and regulations in areas such as grade crossings must be complied with. Systems such as Positive Train Control (PTC) and Automatic Train Control (ATC) increase performance of trains and railroads in terms of for example speed, reliability, and safety. Such automatic systems may rely on positioning systems, such as Global Positioning System (GPS) receivers, to determine train position, train direction, and train speed. However, positioning information may not always be available due to certain environmental circumstances or GPS receivers may fail. Thus, it is important to have another mechanism to determine speed, direction and position.

Another mechanism that can be used for determining speed, distance, position is to measure rotation of a motor, axle or wheel of the train. In order to calculate speed and distance of the train, the measured rotation combined with a wheel diameter is used. Each time the wheel makes a complete revolution, distance traveled by the wheel is equal to its circumference, in the absence of wheel slip/slide. Based on the wheel diameter D of the wheel, the distance C travelled for each revolution of the wheel is $C=\pi D$. However, an incorrect wheel diameter will result in incorrect train speed and distance. Hence the wearing of wheels over time results in incorrect speeds and distance if the wheel diameter is not corrected or updated.

SUMMARY

Briefly described, one or more embodiments of the present disclosure provide for a system and method for automatic wheel diameter measurement and calibration, for example in connection with trains. However, it should be noted that the described system and method can be utilized in connection with any vehicle where speed and distance is calculated from a rotational source.

A first aspect of the present disclosure provides a system for automatic wheel diameter measurement and calibration, the system comprising at least one sensing device configured to sense rotation of a wheel of a vehicle and provide rotation data of the wheel, a positioning system configured to provide positioning data of the vehicle, the positioning data including a start point and an end point along a path travelled by the vehicle, and a controller configured to automatically calculate a wheel diameter and a wheel diameter inaccuracy based on the rotation data and the positioning data during operation of the vehicle, and a distance between the start point and the end point extracted from a database.

A second aspect of the present disclosure provides a method for automatic wheel diameter measurement and calibration, the method comprising receiving rotation data of a wheel of a vehicle and positioning data of the vehicle, wherein the positioning data include a start point and an end point along a path travelled by the vehicle, extracting a distance between the start point and the end point from a database, and automatically calculating a wheel diameter and a wheel diameter inaccuracy based on the rotation data and the positioning data and the distance between the start point and the end point during operation of the vehicle.

A third aspect of the present disclosure provides a non-transitory computer readable medium storing executable instructions, which, when executed by a computer, perform a method for automatic wheel diameter measurement and calibration as described herein.

BRIEF DESCRIPTION OF THE DRAWINGS

FIG. 5a and FIG. 5b illustrate diagrams of wheel diameter calculations in accordance with exemplary embodiments of the present disclosure.

FIG. 8a and FIG. 8b illustrate diagrams of wheel diameter measurements when wheel wear has been detected in accordance with an exemplary embodiment of the present disclosure.

DETAILED DESCRIPTION

Figure 1:
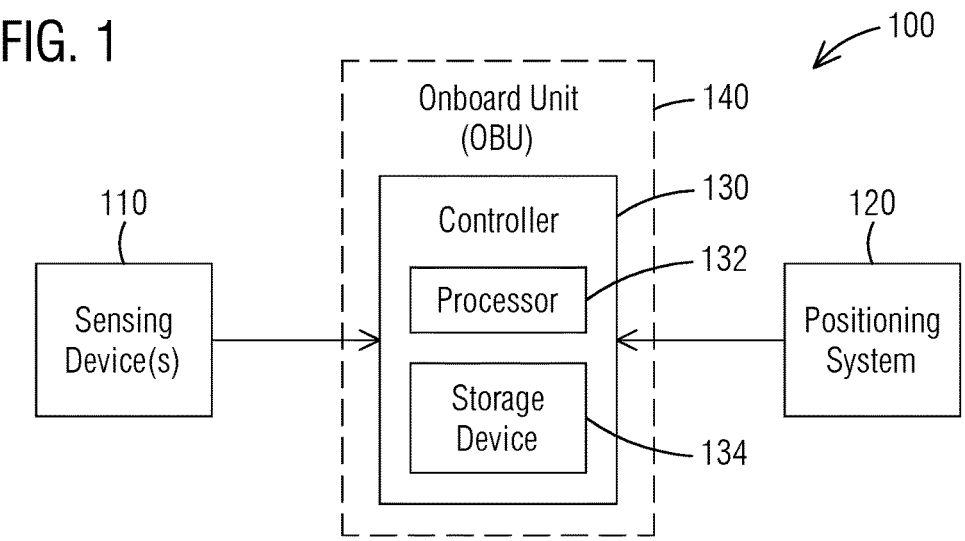
FIG. 1 illustrates a block diagram of a system for automatic wheel diameter measurement and calibration in accordance with an exemplary embodiment of the present disclosure.

To facilitate an understanding of embodiments, principles, and features of the present disclosure, they are explained hereinafter with reference to implementation in illustrative embodiments. In particular, they are described in the context of methods and systems for automatic wheel diameter measurement and calibration.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A safety system can be designed to compare data/information of multiple sources to ensure proper operation and to detect discrepancies, mismatches, or errors. For example, a safety system of a vehicle, such as a train, may comprise multiple systems to determine speed, position, distance etc., including for example a satellite based positioning system and a system based on rotation measurements of a wheel. By comparing the data of the different systems, e. g. speed, position, distance, it can be determined whether the system(s) is/are healthy or unhealthy. Further, it is important to have multiple systems to ensure proper and safe operation in case that one of the systems fails. With respect to the rotation measurements, errors in the calculation of speed and distance can occur due to an incorrect wheel diameter. Therefore, it is highly important to periodically measure the wheel diameter of the associated wheel and update the wheel diameter and wheel diameter error (inaccuracy) settings. Such information and settings are stored for example in an Onboard Unit (OBU) located in a locomotive of a train. An OBU monitors and controls train movement, for example if a train operator (engineer) fails to respond to warnings. Further, the OBU can be a component of a train control system, such as a PTC system, wherein the OBU is in communication with other components of the PTC system. It should be noted that the described system and method may be applied to OBUs in connection with other train control systems, such as ATC and/or ACSES (Advanced Civil Speed Enforcement System) etc.

During commissioning time of an OBU, the commissioner manually measures and inputs the wheel diameter and wheel diameter inaccuracy into the OBU by adjusting the specific configurable parameters. These values are used as input into the OBU's navigation package. Over time, due to normal operational usage and physical wear, the wheel diameter will change. There can be undesired navigation behavior if the real wheel diameter differs from the wheel diameter setting in the OBU. To update the wheel diameter setting, maintenance personnel must make a measurement of the wheel, connect directly to the OBU with a computer and use the Onboard Maintenance Tool to input the new values in the OBU. However, the manual wheel diameter measurement and adjustment process is cumbersome, whereas an automated system and process of wheel diameter measurement reduces the need for manual maintenance activities.

FIG. 1 illustrates a block diagram of a system 100 for automatic wheel diameter measurement and calibration in accordance with an exemplary embodiment of the present disclosure. As noted, the system and method described herein are specifically designed for trains but can be applied to other vehicles.

The system 100 comprises one or more sensing device(s) 110, a positioning system 120 and a controller 130. The one or more sensing device(s) 110 is/are configured to sense rotation of a wheel of a vehicle and provide rotation data of the wheel. Specifically, the sensing device(s) 110 measure rotation of the wheel and can be for example a wheel tachometer or other type of revolution counter device, including mechanical, magnetic, and optical devices. The sensing device(s) 110 may measure the rotation of the wheel directly or may measure the rotation of an axle to which the wheel is connected or may measure rotation of a motor driveshaft or gear that powers the wheel. A vehicle, e. g. train, can comprise one or multiple of such rotation sensing device(s) 110, either of the same type or different types.

The positioning system 120 is configured to provide positioning data of the vehicle. The positioning system 120 can be a Global Positioning System (GPS) receiver. The GPS receiver can be any type, including differential GPS receiver. Other types of positioning systems 120, such as inertial navigation system (INS s) and Loran systems, can also be used. Still other types of positioning systems 120 can include for example transponder tags embedded in tracks and corresponding reader(s) carried by the train or vehicle, or image based solutions, for example camera(s) carried by the train or vehicle and configured to see/detect sign(s) along the path or track. The positioning system 120 is located on the vehicle.

Both the positioning system 120 and sensing device(s) 110 are coupled to and transmit data to the controller 130. The controller 130 includes at least one processor 132, for example a microprocessor, and a storage device 134. The controller 130 is located on the vehicle, for example within an Onboard Unit (OBU) 140, which can be a component of a PTC system and/or ATC system of the train. The positioning system 120 may also be part of the OBU 140.

The storage device (memory) 134 includes software with a variety of applications. One of the applications includes a method for automatic wheel diameter measurement and calibration. Generally, for this application, the controller 130 is configured, via computer executable instructions, to automatically calculate a wheel diameter and a wheel diameter inaccuracy based on the rotation data and the positioning data during operation of the vehicle, the rotation data being provided by the sensing device(s) 110 and the positioning data being provided by the positioning system 120. Further details with respect to the automated calculation and calibration of the wheel diameter are described below.

In accordance with exemplary embodiments of the present disclosure, the system 100 and associated method(s) automatically calculate and adjust the wheel diameter based on data collected from sensing device(s) 110 and positioning system 120. The controller 130 of the OBU 140 can determine an actual wheel diameter, based on the number of wheel revolutions and distance traversed, and can adjust the wheel diameter value in the OBU 140 accordingly. Further, the controller 130 and/or OBU 140 can be configured to log an event each time a new wheel diameter has been calculated and report the events to an Event Recorder (ER) onboard the train.

Calculated Wheel Diameter and Wheel Diameter Inaccuracy

A wheel diameter is calculated based on the following formula:

$$WD_{calculaced} = d_{travelled} \times \frac{N_{ppr}}{N_{pulses} \times \pi}$$

where:
WD$_{calculated}$=calculated wheel diameter,
d$_{travelled}$=actual distance travelled for this measurement,
N$_{ppr}$=number of pulses per wheel revolution,
N$_{pulses}$=number of pulses measured by the wheel tachometer during the travelled distance.

A wheel diameter inaccuracy (error) is calculated as:

$$WD_{error} = \frac{\sum_{i=1}^{n} (TrackError_i) + (SF \times GpsError_{start}) + (SF \times GpsError_{end})}{d_{travelled}}$$

where:

$WD_{error}$=calculated wheel diameter error (% inaccuracy),
$d_{travelled}$=actual distance travelled for this measurement,
$TrackError_i$=error in the block boundary location due to measurement error when track file was created, estimated to be 6 ft.,
i=index of summation,
n=number of block boundaries traversed by the actual distance travelled for this measurement,
$GpsError_{start}$=error in the GPS location reading at the start location,
$GpsError_{end}$=error in the GPS location reading at the end location,
SF=safety factor (×8) that scales raw GPS inaccuracy to be acceptable for safety. Raw GPS inaccuracy is based on a 50% probability of correctness, but for safety reasons this "confidence" needs to be much higher.

Figure 2A:
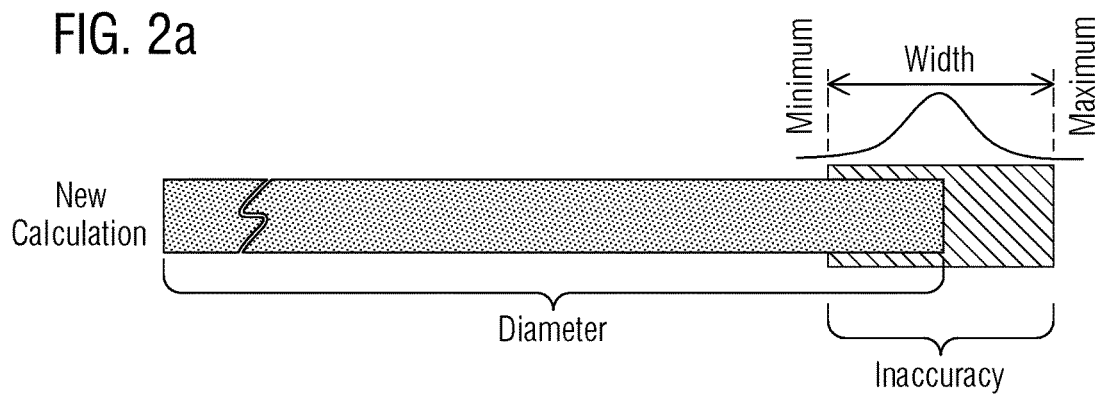
FIG. 2a and FIG. 2b illustrate diagrams showing a relationship between calculated wheel diameter and wheel diameter inaccuracy, and a true wheel diameter compared to calculated wheel diameters from measurement iterations, in accordance with exemplary embodiments of the present disclosure.

FIG. 2a illustrates a diagram showing the relationship between calculated wheel diameter and wheel diameter inaccuracy, in accordance with the formulas described above. The Gaussian curve represents the likelihood of the wheel diameter being correct. The wheel diameter inaccuracy comprises an inaccuracy band with a minimum and a maximum, wherein the inaccuracy band includes positioning data errors and encompassing a true wheel diameter of the wheel.

Figure 2B:
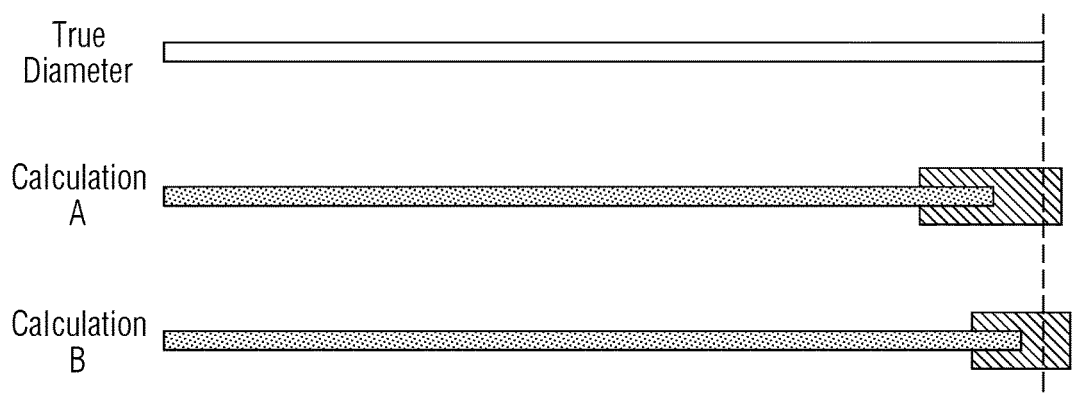

FIG. 2b illustrates a diagram showing a true wheel diameter compared to calculated wheel diameters from measurement iterations. The true diameter is not actually known, but it is iteratively estimated by the described process. Each calculated diameter may not be exactly equal to the true diameter but has an inaccuracy band that encompasses the true wheel diameter.

Principles

The wheel diameter and wheel diameter inaccuracy calculations are based on distance travelled, compared to the number of wheel revolutions for that distance, see wheel diameter formula. The distance travelled can be any distance and therefore can vary with each measurement. Longer distances result in less inaccuracy and a better result, see wheel diameter inaccuracy formula.

In accordance with an embodiment of the present disclosure, at least two points along a path or track (e. g. endpoints, or start point and end point) are chosen, wherein the at least two points are provided by the positioning system 120 and indicate where the train or vehicle is travelling. The two points, specifically the start point and end point, are matched to (map-)points in a database or source, and a distance travelled between the two (map-)points is extracted from the database or source. The database or source is a representation of tracks or paths where the train or vehicle may be travelling. For example, a track database (TDB), herein also referred to as track file, is a representation of all tracks where trains can travel. Extracting the distance from the database or source accounts for track curvature. This way, there is no need for integration over a specific curved track section to get the accurate distance traveled.

If the OBU/positioning system 120 is localized, the distance travelled is measured by map-matching the "endpoints" of the measurement distance to points in the track file, then using the sum of block lengths to calculate the distance. This is more accurate than using the positioning system 120 to directly measure distance (without track file) for the following reasons:

Because of track curvature, direct measurement by the positioning system 120 requires "integration" or summing of many chord lengths resulting in accumulation of errors. In contrast, the track file method sums the lengths of blocks in the track file. Further, the inaccuracy of the positioning system coordinates in the track file are assumed to be more accurate than a single reading of the location by the OBU.

Since the distance travelled can vary, a choice of start point(s) and end point(s) may vary. To reduce the wheel diameter inaccuracy and achieve a better result, start and end points with less error should be chosen. Further, calculations should avoid any disqualifying events, as mentioned below.

Disqualifying Events

A disqualifying event represents a point in time during which one or more monitored unfavorable conditions for the automatic wheel diameter calculation algorithm have occurred. The data at these points will be avoided. Generically, a disqualifying event is when a segment or sample is discarded because the positioning system 120 has lost location/position, or there is a mismatch between speed sources that exceeds some high/low comparators. The following are examples of such disqualifying events: a) positioning system 120 becomes delocalized; b) wheel slip/slide has occurred. With respect to a), when the positioning system 120 loses its position, it becomes delocalized. Delocalization of the positioning system 120 can occur for multiple reasons, such as loss of visibility to satellites, low accuracy, location deviates from centerline of track database by too much, etc. With respect to b), wheel slip/slide will produce an inaccurate reading of wheel revolutions (pulses). Navigation software can detect wheel slip/slide based on comparison of speed of sensing device 110 vs. speed of positioning system 120, sudden change in speed of sensing device 110, and other means. Further disqualifying events may be related to irregular Locomotive acceleration, and positioning system speed inaccuracy/error.

Figure 3:
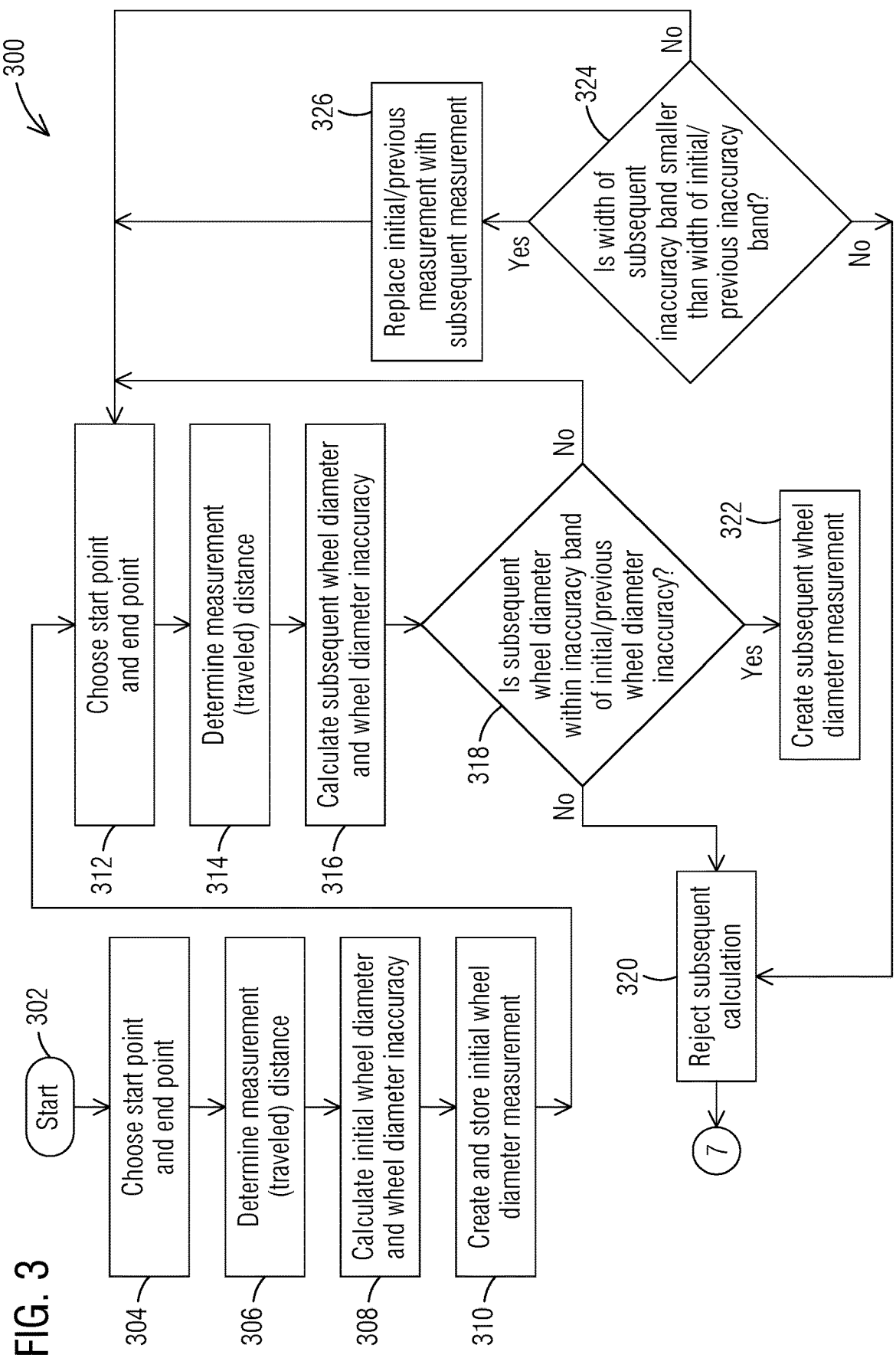
FIG. 3 illustrates a flow chart of a method for automatic measurement and calibration of a wheel diameter in accordance with an exemplary embodiment of the present disclosure.

FIG. 3 illustrates a flow chart of a method 300 for automatic measurement and calibration of a wheel diameter in accordance with an exemplary embodiment of the present disclosure. The method may be performed utilizing a system 100 with OBU 140 and controller 130 as described with reference to FIG. 1.

While the method 300 is described as a series of acts or steps that are performed in a sequence, it is to be understood that the method may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

Generally, the method comprises receiving rotation data of a wheel of a vehicle and positioning data of the vehicle, and automatically calculate a wheel diameter and a wheel diameter inaccuracy based on the rotation data and the positioning data during operation of the vehicle. The method 300 will now be described in more detail.

The method 300, e. g. algorithm, is executed continuously and repeatedly. For each iteration, if a new calculation result has less inaccuracy than a previous result, the new calculation replaces the previous. Such a process iteratively converges on a 'best' result.

The method may start at 302. In act 304, for travelled distance, herein also referred to as measurement distance, at least two points, more specifically a start point and an end point, are chosen. The calculation process continuously monitors the positioning system (GPS) inaccuracy and remembers the best (smallest) value within for example the last 60 seconds (or other period, or a fixed distance) along with its location. These "best" samples are used to select the start and end points for the calculation distance.

In an example, after an occurrence of a disqualifying event, the start point can be chosen. After the start point is chosen, the end point can be chosen. The algorithm is designed to consider a minimum distance, e. g. x miles, between the start and end points chosen for the calculation. To achieve best results, the algorithm chooses the longest possible distance between disqualifying events. The end point can be chosen as the "best" sample that occurred leading up to the next disqualifying event.

In an embodiment, if a significant distance has been reached before any disqualifying event, then the end point is chosen regardless of a disqualifying event, so that a new calculation can be made. In this case, the start point can remain, and new calculations can be made iteratively with increasing distances (and increasingly better results) until a disqualifying event occurs. As soon as a disqualifying event occurs, a new start point is chosen, and the entire process begins again.

Figure 4:
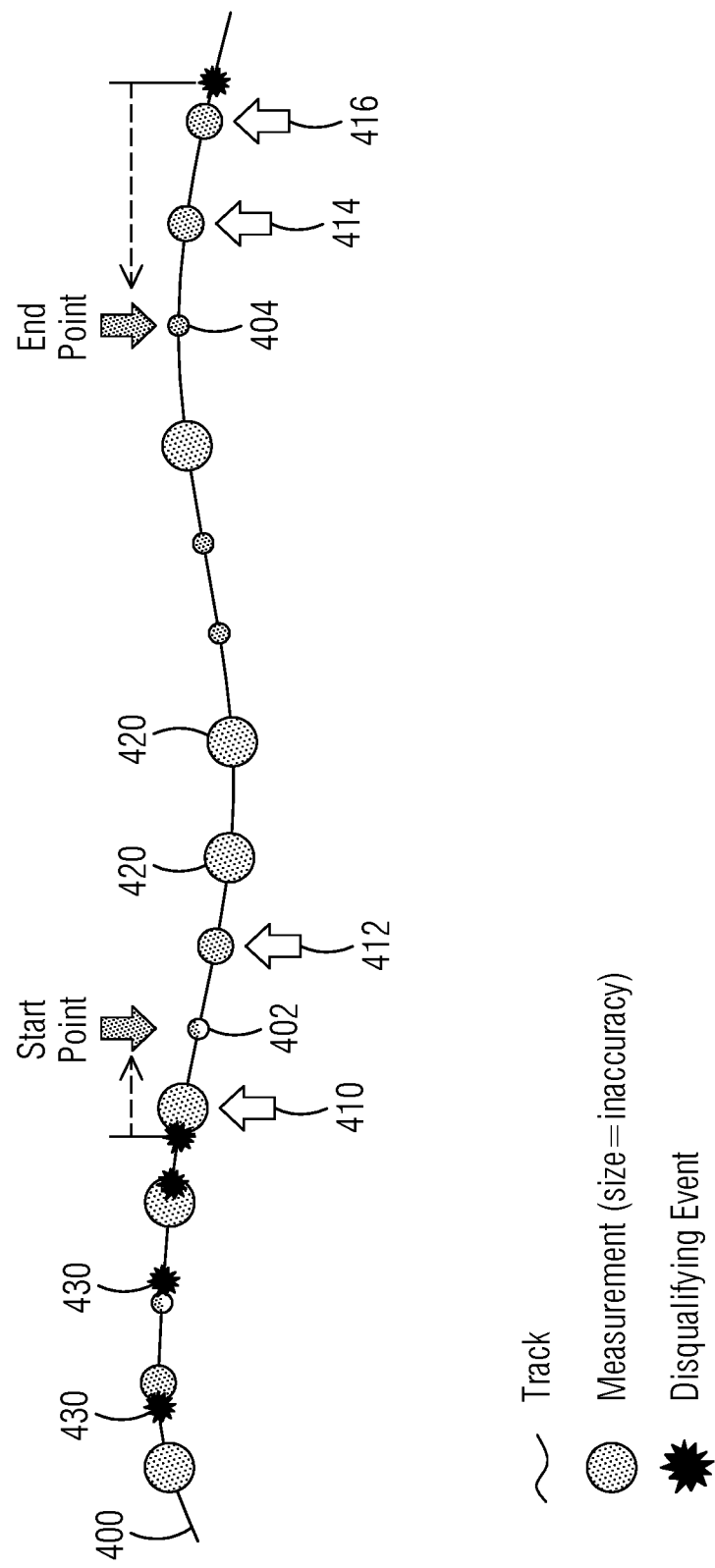
FIG. 4 illustrates a track including calculation samples of positioning systems (GPS) inaccuracies along the track, disqualifying events and selection of starting and ending points between disqualifying events in accordance with an exemplary embodiment of the present disclosure.

FIG. 4 illustrates a (travelled) track 400 including calculation samples of positioning systems (GPS) inaccuracies along the track 400. The track 400 includes selected start point 402 and selected end point 404. Elements 410, 412, 414, 416 show potential start/end point candidates that are rejected, due to greater positioning system inaccuracies compared to start point 402 and end point 404. The positioning system (GPS) inaccuracies are illustrated by circles 420, wherein a greater size of a circle corresponds to a greater inaccuracy. Further, elements 430 illustrate disqualifying events, as described earlier.

Returning now to FIG. 3, in act 306, a measurement distance, e. g. travelled distance, is extracted from a database. More specifically, the measurement distance is determined by summing length of all track blocks travelled between the start and end points, and by pro-rating partial blocks at the start point and the end point, from the database. For example, a length of each track block is obtained from the route, indirectly from the TDB (track file).

Once the start and end points are chosen and the measurement distance has been determined, an initial wheel diameter and initial wheel diameter inaccuracy are calculated, see act 308, according to the formulas above. Based on the initial calculations, an initial wheel diameter measurement is created and stored in the OBU 140, see act 310. The initial calculations of wheel diameter and wheel diameter inaccuracy are performed once at the beginning of the process. After the initial calculation, the method 300 performs a continuous, repetitive routine, wherein wheel diameters and wheel diameter inaccuracies are repeatedly calculated during operation of the vehicle, e. g. train, and wheel diameter measurements created and stored in the OBU 140. Acts 312, 314, 316 include choosing start and end points and calculating a subsequent (new) wheel diameter with associated wheel diameter inaccuracy.

As per decision act 318, if the subsequent wheel diameter falls within the initial (or previous) inaccuracy band, the subsequent wheel diameter is accepted (yes), whereas if the subsequent wheel diameter is outside the initial (or previous) inaccuracy band, the subsequent wheel diameter is rejected (no), see act 320. Further, if a wheel diameter is rejected, the routine reverts to step 312 and performs a new calculation. If the (subsequent) wheel diameter calculations are accepted, a subsequent (new) wheel diameter measurement with associated inaccuracy band is created, see act 322.

FIG. 5a and FIG. 5b illustrate diagrams of wheel diameter calculations in accordance with exemplary embodiments of the present disclosure. As per FIG. 5a, a subsequent (new) calculation comprises a wheel diameter that is within the inaccuracy band of the previous (or initial) measurement. Thus, the new calculation is accepted. In contrast, FIG. 5b illustrates a subsequent calculation with a calculated diameter that lies outside the inaccuracy band of the previous measurement, stored in the OBU 140, and is thus rejected.

Figure 6:
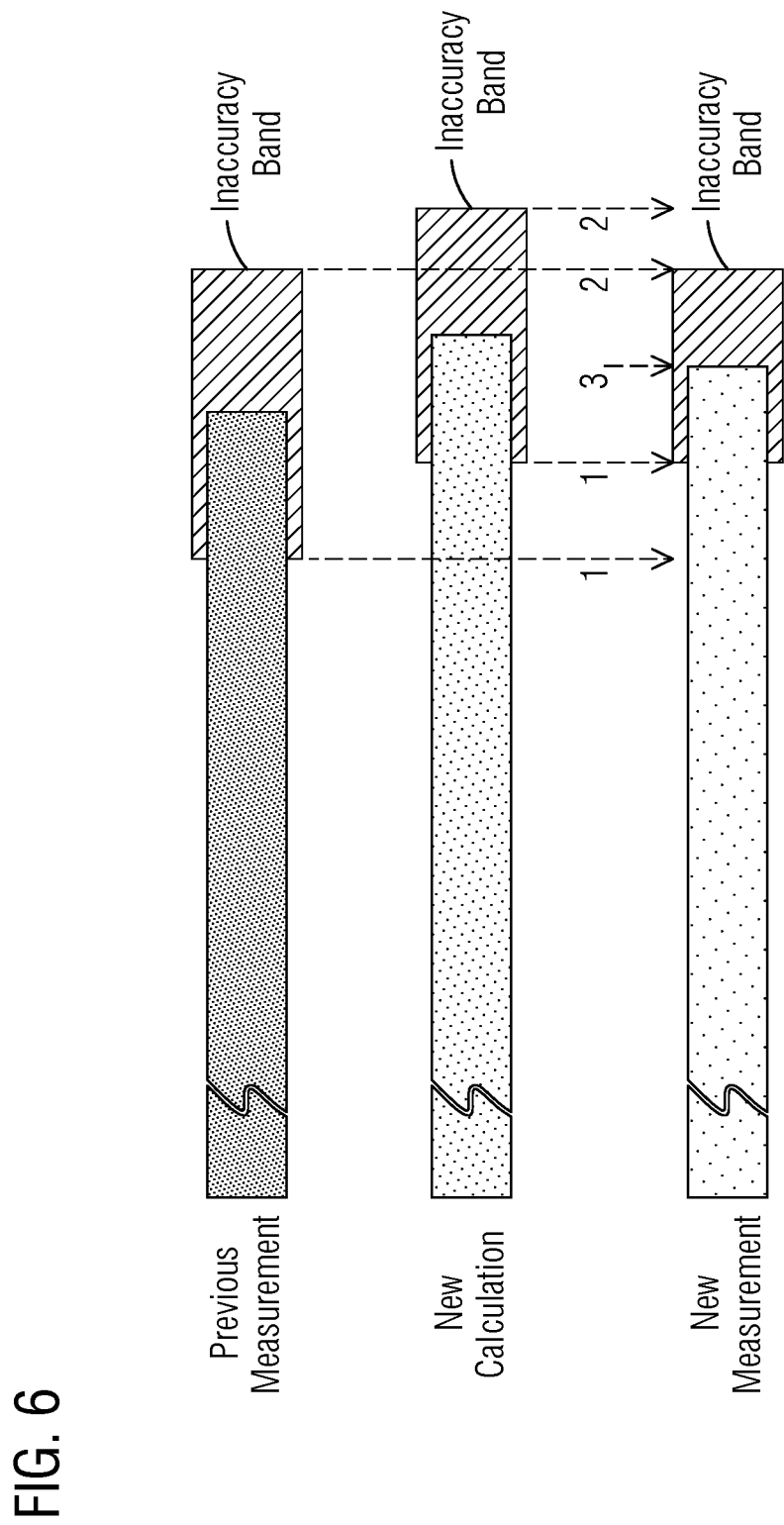
FIG. 6 illustrates diagrams in connection with creation of a new wheel diameter measurement in accordance with an exemplary embodiment of the present disclosure.

As noted, if the (subsequent) wheel diameter calculations are accepted, a subsequent (new) wheel diameter measurement with associated inaccuracy band is created. FIG. 6 illustrates a diagram showing creation of a new wheel diameter measurement in accordance with an exemplary embodiment of the present disclosure.

The new (adjusted) wheel diameter measurement is created as follows:
1. A minimum of the new inaccuracy band is set to be equal to the greater of the minimums of the initial and subsequent inaccuracy bands, see labels "1".
2. A maximum of the adjusted inaccuracy band is set to be equal to the lesser of the maximums of the initial and subsequent inaccuracy bands, see labels "2".
3. A new (adjusted) wheel diameter is set at a midpoint of the adjusted inaccuracy band, see label "3".

Returning to FIG. 3, after creation of the new (subsequent) wheel diameter measurement (step 322), according to decision block 324, if a width of the new (adjusted) inaccuracy band is less than the width of the previous (or initial) inaccuracy band (yes), the new wheel diameter measurement is stored and replaces the previous (initial) wheel diameter measurement, see act 326. After storing and replacing the previous wheel diameter in the OBU 140, the routine returns to act 312 and performs a new calculation. However, if the width is greater than the width of the previous measurement, then the measurement/calculation is rejected, see act 320, and the method returns to act 312. The width extends between minimum and maximum of a wheel diameter inaccuracy band, see FIG. 2a.

Logging and Reporting of Wheel Diameter Calculations

As noted, each time a new wheel diameter and the associated inaccuracy have been calculated, the OBU 140 is configured to log an event and record the calculated wheel diameter value and inaccuracy along with a time stamp in the OBU internal log files. The OBU 140 is configured to report to the Event Recorder on the locomotive, for example only the events of the wheel diameter and inaccuracy calculations which resulted in an update to the set values. Additionally, the OBU 140 allows a user to access the wheel diameter data (wheel diameter value, inaccuracy, the time the wheel diameter and inaccuracy were calculated, plus the timestamp when the calculated wheel diameter was set as an active value in the OBU 140) via a diagnostics screen.

In another embodiment, the system 100 with OBU 140 can be configured so that logged wheel diameter calculations are accessible via external monitoring, for example through Interoperable Train Control Systems Management (ITCSM), or other external remote monitoring systems. With this approach, the wheel diameter calculation events and the associated data can be defined in a data dictionary, with defined structure and data elements for querying via ITCSM. Further, notifications of any wheel diameter changes via ITCSM can be generated and transmitted to designated systems.

Wheel Wear Adjustment

Wheel wear will cause the true diameter of a wheel to reduce over time. Wheel wear is expected to progress very slowly, but it will happen eventually. However, braking, especially emergency braking, can cause more dramatic wheel wear. If no accommodation was given to wheel wear, then the algorithm described above would eventually reject new calculations that fall below the current measurement inaccuracy band, even though these new calculations reflected accurate estimations of a wheel that has reduced size because of wear.

Figure 7:
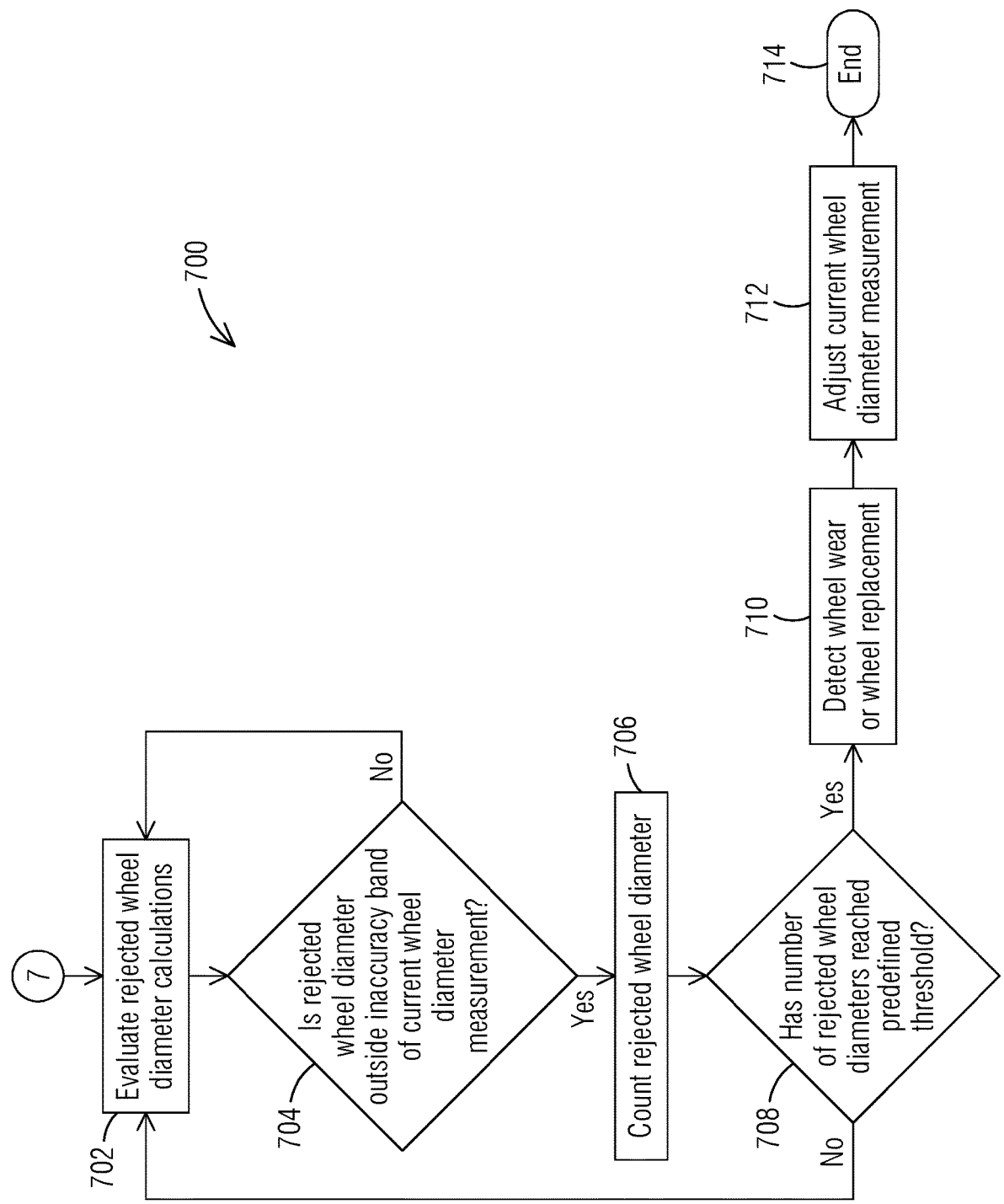
FIG. 7 illustrates a flow chart of a method for detecting wheel wear in accordance with an exemplary embodiment of the present disclosure.

FIG. 7 illustrates a flow chart of a method 700 for detecting wheel wear in accordance with an exemplary embodiment of the present disclosure. The method 700 may be a sub-routine of method 300 and may be performed utilizing a system 100 with OBU 140 and controller 130 as described with reference to FIG. 1.

In accordance with an exemplary embodiment of the present disclosure, the described system 100 and method 700 monitors for wheel wear by counting how many new diameter calculations are rejected because they fall below the inaccuracy band of the current measurement.

In an embodiment, following step 320 ("Reject subsequent calculation") in FIG. 3, the controller 130 of OBU 140 is configured to evaluate or examine rejected wheel diameter calculations, act 702. As per decision block 704, it is examined whether the rejected wheel diameter is below the inaccuracy band of the current wheel diameter measurement. If yes, then this calculation is counted, see act 706. If too many (for example according to a predefined threshold) new calculations fall below the inaccuracy band of the current measurement, while none fall above the band, then it is assumed that wheel wear has occurred, see acts 708 and 710. Following detected wheel wear, the current (previous) wheel diameter measurement is adjusted, see act 712. At 714, the method 700 may end.

FIG. 8a and FIG. 8b illustrates diagrams of wheel diameter measurements when wheel wear has been detected in accordance with an exemplary embodiment of the present disclosure.

To adjust for wheel wear, the previous measurement diameter is reduced by 50% of the previous inaccuracy amount and the inaccuracy is increased by the same amount. In an example, if the current wheel diameter is 40.667 inches and the current wheel diameter inaccuracy is 0.6% (0.244 inches), then the adjusted wheel diameter is (40.667-0.122=40.545 inches) and the adjusted wheel diameter inaccuracy is (0.6+0.3=0.9%). Such an adjustment lowers the diameter and the lower bound (minimum) of the inaccuracy band but keeps the upper bound (maximum) of the inaccuracy band unchanged. While this adjustment increases the inaccuracy band, further measurement iterations may then again decrease the size of the inaccuracy band.

Wheel Replacement Adjustment

Due to wear or excessive damage, wheels, for example locomotive wheels, are eventually replaced with a set of brand-new wheels or remanufactured wheels. Like accommodating for wheel wear adjustment, the described system and methods are designed to accommodate for an increase in wheel diameter due to wheel replacement. If, during wheel replacement the maintenance crew does not manually update wheel diameter and inaccuracy, then the system and methods described herein are configured to eventually reject new calculations that fall above the current measurement inaccuracy band, even though these new calculations reflect accurate estimations of a wheel that has increased in size because of wheel replacement and adjust the calculation with the goal to produce an acceptable measurement.

In an embodiment, the method 300 comprises monitoring for wheel size increase by counting how many new wheel diameter calculations are rejected because they fall above the inaccuracy band of the current measurement. If too many (for example according to a predefined threshold) new calculations fall above the inaccuracy band of the current measurement, while none fall below the band, then it is assumed that wheel size has increased (contrary and opposite of wheel wear detection, as described with reference to FIG. 7).

Figure 9A:
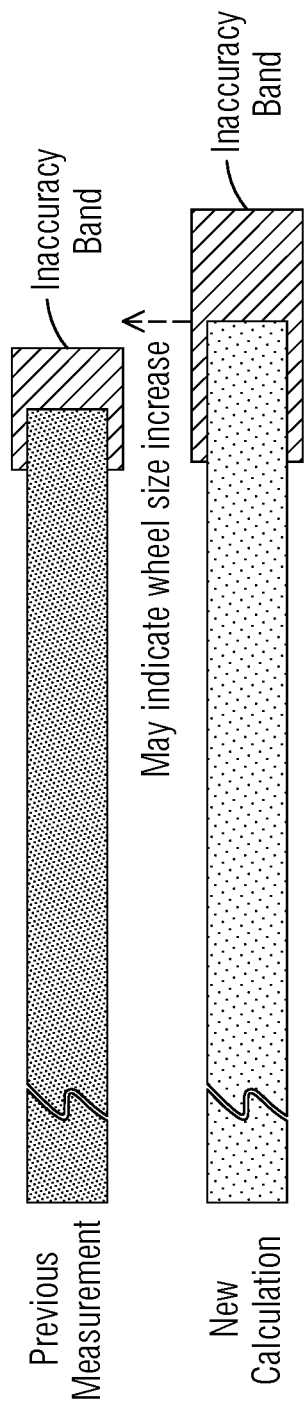
FIG. 9a and FIG. 9b illustrate diagrams of wheel diameter measurements in connection with wheel replacement adjustment in accordance with an exemplary embodiment of the present disclosure.
Figure 9B:
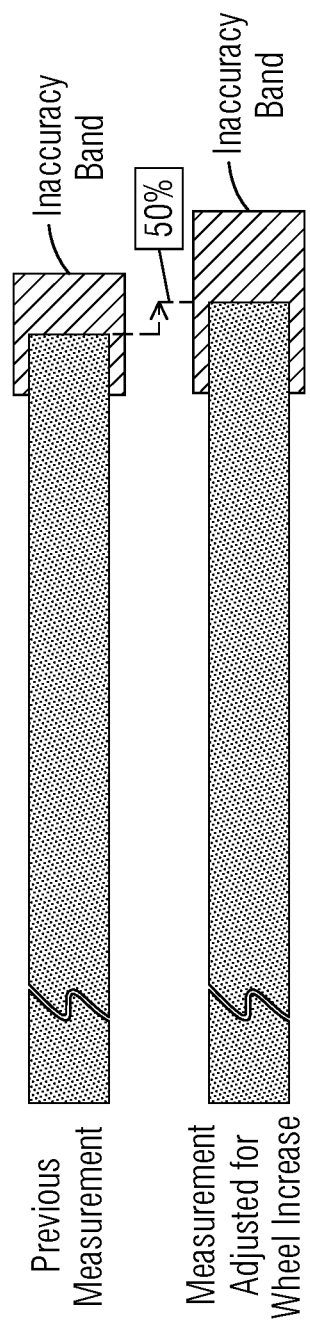

FIG. 9a and FIG. 9b illustrate diagrams of wheel diameter measurements in connection with wheel replacement adjustment in accordance with an exemplary embodiment of the present disclosure.

To adjust for wheel size increase that has been detected, the previous measurement diameter is increased by 50% of the previous inaccuracy amount and the inaccuracy is increased by the same amount. In an example, if the current wheel diameter is 40.667 inches and the current associated wheel diameter inaccuracy is 0.6% (0.244 inches), then the adjusted wheel diameter is (40.667+0.122=40.789 inches) and the adjusted inaccuracy is (0.6+0.3=0.9%). Such an adjustment increases the diameter and the upper bound (maximum) of the inaccuracy band but keeps the lower bound (minimum) of the inaccuracy band unchanged. While this adjustment increases the inaccuracy band, further measurement iterations may then again decrease the size of the inaccuracy band.

Maintenance Scenarios

Scenario 1— Fresh Installation of OBU package

In scenario 1, a train, specifically a locomotive, is receiving a fresh, brand new installation of an OBU package. An OBU package as used herein includes for example vital and non-vital computers, applications that enforce movement authority and speed restrictions and applications that manage and supervise train speed and location. Settings for the wheel diameter associated with the wheel tachometer and the wheel diameter accuracy error (i.e., measurement error or inaccuracy) are entered manually by an installation crew. The crew manually measures the wheel diameter and updates the corresponding wheel diameter and inaccuracy parameters, for example by utilizing an onboard maintenance tool (OMT) device. To determine a measurement error, the crew can follow their railroad's standard technique in doing so (this error may be on the order of 1% but can vary based on the technique used). Additionally, the crew uses the OMT device to clear the current "active" settings for the wheel diameter and inaccuracy in the OBU, which allows copying of the manually updated parameters into the "active" values. Further updates to the wheel diameter and inaccuracy settings are expected to occur automatically, as described herein.

Scenario 2— Wheel Replacement (Wheel Change-Out)

In scenario 2, the train, i. e. locomotive, is already equipped with the OBU package. Due to excessive wheel wear, damage, or per scheduled maintenance, the wheel associated with the wheel tachometer is being replaced with a new wheel. Scenario 2 is similar to scenario 1—the crew has to manually measure the wheel diameter and use the OMT device to update the corresponding wheel diameter and inaccuracy parameters. Additionally, the crew will clear out the "active" wheel diameter and inaccuracy values in the OBU, which will trigger the OBU to copy the manually set values from the parameters into the "active" settings to be used for the wheel tachometer-based speed and distance calculation. Further updates to the wheel diameter and inaccuracy settings are expected to occur automatically, as described herein.

In the scenario where the wheel associated with the wheel tachometer is replaced with a new wheel (which presumably would have a larger diameter) and the crew does not update the wheel diameter and inaccuracy parameters in the OBU, the OBU will automatically update the wheel diameter based on the logic described in the "Wheel Replacement Adjustment" section above.

Scenario 3— Wheel Truing

In scenario 3, the train, i. e. locomotive, is already equipped with the OBU package. However, due to sustained wheel damage, such as during intensive braking, the wheels can develop flat spots or otherwise the wheel profile may be out of spec. Rather than replacing these wheels with brand new wheels, the damaged wheels are repaired and reused to reduce costs. The process of repairing the flat spots and the profile of damaged wheels is called wheel truing. After the wheels are trued and reinstalled, the maintenance crew measures and updates the wheel diameter and the inaccuracy parameters in the OBU, as described in the above two scenarios. Further updates to the wheel diameter and inaccuracy settings are expected to occur automatically, as described herein.

In the scenario where the wheel associated with the wheel tachometer is replaced with a repaired wheel (after truing, with the wheel now presumably having a smaller diameter), and the crew does not update the wheel diameter and inaccuracy parameters in the OBU, the OBU will automatically update the wheel diameter based on the logic described in the "Wheel Wear Adjustment" section above.

Scenario 4— Replacement of the OBU

In scenario 4, the train, i. e. locomotive, is equipped with the OBU package. However, due to a potential OBU hardware failure or irreparable damage, the OBU unit itself is being replaced. In this scenario, the latest wheel diameter and inaccuracy settings will be preserved in a separate storage device that is installed on board the locomotive. After replacement of the OBU (main box), the new OBU will update its active wheel diameter and inaccuracy settings by retrieving them from the (separate) storage device. Therefore, manual wheel diameter update by an installation or maintenance crew is not required.

After each of the described maintenance scenarios, during subsequent locomotive operations, the wheel diameter and inaccuracy parameters will be updated automatically by the OBU.

With the described system 100 and methods 300, 700, wheel diameters, specifically for trains, are automatically calculated and adjusted based on data collected from a positioning system, such as a GPS receiver, and sensing device(s), such as wheel tachometer(s). The provided solution is performed by the controller 130 of the OBU 140, and logged data relating to the wheel diameter calculations are accessible by other systems and/or users (personnel). Existing trains, especially locomotives including OBUs, can be retrofitted with the provided software solution if sensing device(s) and a positioning system are available on the train.

The invention claimed is:

1. A method for automatic wheel diameter measurement and calibration, the method comprising:

measuring rotation of a wheel of a train when the train is travelling along a path, determining positions of the train when the train is travelling along the path, wherein the positions are determined by a positioning system located on the train, receiving, by a controller on the train, rotation data of the wheel and positioning data of the train, wherein the rotation data include number of wheel revolutions, and wherein the positioning data include a start point and an end point along the path travelled by the train, extracting, by the controller, a distance between the start point and the end point from a database, and automatically calculating, by the controller, a wheel diameter and a wheel diameter inaccuracy, wherein the wheel diameter is calculated on the number of wheel revolutions and distance traversed by the train, adjusting, by the controller, a wheel diameter value in an onboard unit (OBU) of the train using a calculated wheel diameter, and logging an event, by the controller or the OBU, each time the wheel diameter value is adjusted, recording the calculated wheel diameter and the wheel diameter inaccuracy along with a time stamp, and reporting the event which results in an update to set wheel diameter values to an event recorder (ER) onboard the train, wherein the OBU of the train is configured to allow a user to access wheel diameter data via a diagnostic screen, and wherein extracting the distance between the start point and the end point from the database comprises matching the start point and the end point to points in the database, and calculating the distance by summing lengths between the points in the database.

2. The method of claim 1, further comprising:

repeatedly calculating wheel diameters and associated wheel diameter inaccuracies during operation of the train, and creating and storing wheel diameter measurements in the onboard unit of the train.

3. The method of claim 2, wherein calculating the wheel diameters and wheel diameter inaccuracies comprises:

calculating an initial wheel diameter and an initial wheel diameter inaccuracy comprising an initial inaccuracy band, creating and storing an initial wheel diameter measurement in the train, calculating a subsequent wheel diameter and a subsequent wheel diameter inaccuracy comprising a subsequent inaccuracy band, accepting the subsequent wheel diameter if the subsequent wheel diameter falls within the initial inaccuracy band, and creating a subsequent wheel diameter measurement.

4. The method of claim 3, further comprising:

rejecting the subsequent wheel diameter if the subsequent wheel diameter is outside the initial inaccuracy band.

5. The method of claim 4, wherein creating the subsequent wheel diameter measurement comprises:

adjusting the wheel diameter and wheel diameter inaccuracy, wherein a minimum of an adjusted inaccuracy band is set to be equal to the greater of the minimums of the initial and subsequent inaccuracy bands, wherein a maximum of the adjusted inaccuracy band is set to be equal to the lesser of the maximums of the initial and subsequent inaccuracy bands, and wherein the adjusted wheel diameter is set at a midpoint of the adjusted inaccuracy band.

6. The method of claim 5, further comprising:

replacing the initial wheel diameter measurement with the subsequent wheel diameter measurement if a width of the adjusted inaccuracy band is less than the width of the initial wheel diameter inaccuracy band.

7. The method of claim 2, further comprising:

at least one of detecting wheel wear and wheel truing when multiple calculations of the wheel diameters fall below a minimum of a current wheel diameter inaccuracy band of a current wheel diameter measurement.

8. The method of claim 2, further comprising:

detecting wheel replacement when multiple calculations of wheel diameters are above a maximum of a current wheel diameter inaccuracy band of a current wheel diameter measurement.

9. The method of claim 1, wherein the wheel diameter inaccuracy comprises an inaccuracy band with a minimum and a maximum, the inaccuracy band including positioning data errors and encompassing a true wheel diameter of the wheel.

10. A non-transitory computer readable medium storing executable instructions, which, when executed by a computer, perform a method for automatic wheel diameter measurement and calibration as claimed in claim 1.

11. An onboard train system for automatic wheel diameter measurement and calibration, the system comprising:

at least one revolution counter device configured to sense rotation of a wheel of a train and provide rotation data of the wheel, wherein the rotation data include a number of wheel revolutions, a positioning system comprising a global positioning system (GPS) receiver and configured to provide positioning data of the train, the positioning data including a start point and an end point along a path travelled by the train, and a controller configured to receive the rotation data and the positioning data and to automatically calculate a wheel diameter and a wheel diameter inaccuracy based on the number of wheel revolutions and distance traversed by the train, wherein the distance traversed by the train is extracted from a database utilizing the start point and the end point provided by the positioning system, wherein the controller is configured to adjust a wheel diameter value in an onboard unit (OBU) of the train using a calculated wheel diameter, and wherein the controller or the OBU of the train is configured to log an event each time the wheel diameter is adjusted, record the calculated wheel diameter and the wheel diameter inaccuracy along with a time stamp in the OBU internal log files, and to report the event which results in an update to set wheel diameter values to an event recorder (ER) onboard the train, and wherein the OBU of the train is configured to allow a user to access wheel diameter data via a diagnostic screen, wherein the controller is configured to detect wheel wear when multiple calculations of wheel diameters fall below a minimum of a current wheel diameter inaccuracy band of a current wheel diameter measurement stored in the train.

12. The system of claim 11, wherein the wheel diameter inaccuracy comprises an inaccuracy band with a minimum and a maximum, the inaccuracy band including positioning data errors and encompassing a true wheel diameter of the wheel.

13. The system of claim 11, wherein the controller is configured to repeatedly calculate wheel diameters and wheel diameter inaccuracies during operation of the train, and create and store wheel diameter measurements in the onboard unit of the train, wherein the onboard unit includes the controller.

14. The system of claim 11, wherein the controller is configured to calculate an initial wheel diameter and an initial wheel diameter inaccuracy comprising an initial inaccuracy band, create and store an initial wheel diameter measurement in the train, calculate a subsequent wheel diameter and a subsequent wheel diameter inaccuracy comprising a subsequent inaccuracy band, wherein, if the subsequent wheel diameter falls within the initial inaccuracy band, the subsequent wheel diameter is accepted, and wherein, if the subsequent wheel diameter is outside the initial inaccuracy band, the subsequent wheel diameter is rejected.

15. The system of claim 14, wherein the controller is configured to create a subsequent wheel diameter measurement when the subsequent wheel diameter is accepted.

16. The system of claim 15, wherein the subsequent wheel diameter measurement is created based on an adjusted wheel diameter inaccuracy and an adjusted wheel diameter, wherein a minimum of an adjusted inaccuracy band is set to be equal to the greater of the minimums of the initial and subsequent inaccuracy bands, wherein a maximum of the adjusted inaccuracy band is set to be equal to the lesser of the maximums of the initial and subsequent inaccuracy bands, and wherein the adjusted wheel diameter is set at a midpoint of the adjusted inaccuracy band.

17. The system of claim 16, wherein the controller is configured to replace the initial wheel diameter measurement with the subsequent wheel diameter measurement if a width of the adjusted inaccuracy band is less than the width of the initial inaccuracy band.

18. The system of claim 11, wherein the controller is configured to detect wheel replacement when multiple calculations of wheel diameters are above a maximum of a current wheel diameter inaccuracy band of a current wheel diameter measurement stored in the train.

* * * * *